(12) United States Patent
Tanioka

(10) Patent No.: US 8,031,385 B2
(45) Date of Patent: Oct. 4, 2011

(54) METHOD FOR ADJUSTING DRIVE CHARACTERISTICS OF SCANNER DRIVER OF GALVANOMETRIC SCANNER

(75) Inventor: Nozomu Tanioka, Azumino (JP)

(73) Assignee: Harmonic Drive Systems Inc., Tokyo (JP)

(*) Notice: Subject to any disclaimer, the term of this patent is extended or adjusted under 35 U.S.C. 154(b) by 589 days.

(21) Appl. No.: 12/119,222

(22) Filed: May 12, 2008

(65) Prior Publication Data
US 2008/0297867 A1 Dec. 4, 2008

(30) Foreign Application Priority Data

May 29, 2007 (JP) .................................. 2007-142036
Apr. 2, 2008 (JP) .................................. 2008-095978

(51) Int. Cl.
*G02B 26/08* (2006.01)
(52) U.S. Cl. .................... 359/199.1; 359/213.1; 359/900
(58) Field of Classification Search .................. 359/198, 359/199, 213, 214, 900, 198.1, 199.1, 213.1, 359/214.1
See application file for complete search history.

(56) References Cited

U.S. PATENT DOCUMENTS 6,496,213 B1 * 12/2002 Ueno ............................. 347/234

FOREIGN PATENT DOCUMENTS

JP 7-031119 (A) 1/1995
JP 2005-338450 (A) 12/2005

* cited by examiner

*Primary Examiner* — Frank G Font
(74) *Attorney, Agent, or Firm* — Buchanan Ingersoll & Rooney PC

(57) ABSTRACT

A scanner driver of a galvanometric scanner system includes an analog drive circuit; a control unit 31 for storing and holding optimized data formed from combinations of optimal values of circuit constants set in advance in accordance with a plurality of drive modes of a galvanometric scanner; and an electronic trimmer for changing the circuit constants of the analog drive circuit. The control unit selects one of the optimized data in accordance with an external input, and sets or updates parameters of the circuit constants via the electronic trimmer in accordance with the selected optimized data. When a drive mode of the galvanometric scanner system is changed, the scanner driver can accordingly be optimized readily and quickly.

2 Claims, 3 Drawing Sheets

METHOD FOR ADJUSTING DRIVE CHARACTERISTICS OF SCANNER DRIVER OF GALVANOMETRIC SCANNER

TECHNICAL FIELD

The present invention relates to a method for adjusting drive characteristics of a scanner driver of a galvanometric scanner, and more particularly to a method for adjusting drive characteristics of a scanner driver of a galvanometric scanner by which adjustment for optimizing driver operating characteristics of the scan driver can be readily performed according to a variety of drive modes of the galvanometric scanner (drive modes based on, for example, different loads, drive patterns, and response characteristics).

BACKGROUND ART

In a galvanometric scanner system, variable resistors and other elements are used to adjust driver circuit constants of a scanner driver, which is an analog driver, according to a variety of drive modes (drive modes based on, for example, different loads, drive patterns, and response characteristics) so as to optimize the operating characteristics of the scanner driver.

For example, a galvanometric scanner system for light beam scanning includes a galvanometric scanner for oscillating a mirror for light beam scanning within a predetermined angular range and a dedicated scanner driver for driving the galvanometric scanner. A function generator or an external command generator that includes a personal computer and a D/A converter provides a real-time drive command to the scanner driver so as to drive the galvanometric scanner according to predetermined drive control specifications.

The scanner driver includes a plurality of variable resistors and other elements for adjusting the operating characteristics of the scanner driver. To adjust the operating characteristics, an adjuster is connected to the galvanometric scanner and the adjuster is used to adjust the variable resistors and other elements so as to optimize the driver circuit constants in such a way that operating characteristics most suitable to a drive mode are obtained.

For example, optimal operating characteristics of the scanner driver in a case where the galvanometric scanner is to be moved at high speed over a wide range (coarse control) differ from those in a case where the galvanometric scanner is to be moved with high positioning precision over a short distance (fine control). To drive the galvanometric scanner from a position A to a target position B, it is necessary to change an applied command voltage from the command voltage "a" corresponding to the position A to the command voltage "b" corresponding to the position B. The change from the command voltage "a" to the command voltage "b", which are outputted from the external command generator, corresponds to a command for the scanner driver only indicative of the final target position B. Therefore, the path and time from the position A to the position B are set by adjusting the circuit constants of the analog scanner driver. For example, in a case where the drive pattern is set in such a way that the difference between the command voltages "a" and "b" is large, it is necessary to adjust the circuit constants of the scanner driver so as to optimize the operating characteristics in such a way that the galvanometric scanner can be driven with no large amount of overshoot.

Patent Document 1 discloses a galvanometric scanner system using analog input and output values. In Patent Document 1, a variety of drive patterns are stored and held in the scanner driver to drive the galvanometric scanner in an optimal manner. Patent Document 2 discloses a limited-rotation electromagnetic motor with a detector that can be used as a galvanometric scanner for mirror scanning.

[Patent Document 1] JP-A 2005-338450
[Patent Document 2] JP-A 7-31119

As described above, in a galvanometric scanner system, a plurality of variable resistors and other elements are manipulated to adjust the driver circuit constants so as to optimize the operating characteristics of the scanner driver for a variety of drive modes.

To optimize the operating characteristics of the scanner driver, however, it is necessary to adjust a large number of parameters. For example, to adjust the control gain, damping characteristics, integration constant, filter characteristics (resonance characteristics), and robustness of the scanner driver, it is necessary to manipulate a large number of variable resistors, variable capacitors, and other elements. Therefore, the adjusting is not readily performed and is time-consuming.

Since the use of such an adjustment method does not allow flexible adjustment of the scanner driver, optimal operation cannot be achieved when the drive mode of the galvanometric scanner is changed after the adjustment. In this case, it is necessary to connect an adjuster again to the scanner driver and change the variable resistance and other parameters so as to perform adjustment for optimizing the driver operating characteristics (circuit constants). Such adjustment is time-consuming and difficult to perform on the user side.

DISCLOSURE OF THE INVENTION

In view of the issues described above, an object of the invention is to propose a method for adjusting drive characteristics of a scanner driver of a galvanometric scanner, by which, in a case where the drive mode of the galvanometric scanner is set or changed, operating characteristics of the scanner driver can accordingly be optimized readily and quickly.

To achieve the object, a method for adjusting drive characteristics of a scanner driver of a galvanometric scanner according to the invention is characterized in that the method comprises: determining optimized data formed from combinations of optimal values of circuit constants of the scanner driver that drives the galvanometric scanner in accordance with a plurality of drive modes of the galvanometric scanner; storing and holding the optimized data, which correspond to the respective drive modes, in a scanner-side storage section in the galvanometric scanner or a driver-side storage section in the scanner driver; providing an external signal that specifies one of the drive modes to the scanner driver, whereby the optimized data that corresponds to the specified drive mode are outputted from the scanner-side storage section or the driver-side storage section; and, in the scanner driver, setting the circuit constants of the scanner driver or changing the previously set circuit constants of the scanner driver in accordance with the outputted optimized data.

The plurality of drive modes include drive modes based on at least different loads, drive patterns, and response characteristics.

A galvanometric scanner system according to the invention is characterized in that the galvanometric scanner system comprises: a galvanometric scanner; a scanner driver for driving and controlling the galvanometric scanner; and an optimized data storage section for storing and holding optimized data formed from combinations of optimal values of circuit constants of the scanner driver in accordance with a plurality of drive modes of the galvanometric scanner; the scanner driver having: an electronic trimmer for changing the circuit constants of the scanner driver; and a control unit for selecting one of the optimized data stored and held in the storage section in accordance with an external input, and setting or updating parameters of the electronic trimmer to be the selected optimized data.

The optimized data storage section is located in one of an internal memory in the scanner driver and an external memory connected to the scanner driver.

Alternatively, the optimized data storage section is located in one of an internal memory in the galvanometric scanner and an external memory connected to the galvanometric scanner.

A galvanometric scanner driven by a scanner driver according to the invention is characterized in that the galvanometric scanner comprises: a storage section for storing and holding optimized data that correspond to a plurality of drive modes of the galvanometric scanner; and a control unit for outputting the optimized data to the scanner driver in response to a request from the scanner driver, wherein the optimized data are formed from combinations of optimal values of circuit constants of the scanner driver obtained by using the scanner driver to drive the galvanometric scanner in the drive modes.

A scanner driver for driving a galvanometric scanner according to the invention is characterized in that the scanner driver comprises: an electronic trimmer for changing circuit constants of the scanner driver; a storage section for storing and holding optimized data formed from combinations of optimal values of the circuit constants set in advance in accordance with a plurality of drive modes of the galvanometric scanner; and a control unit for selecting one of the optimized data stored and held in the storage section in accordance with an external input, and setting or updating parameters of the electronic trimmer to be the selected optimized data.

In the invention, the scanner driver is used to actually drive the galvanometric scanner in a variety of drive modes requested by a user, and the circuit constants of the scanner driver that are optimal for the drive modes are determined. The optimized data determined for each of the drive modes are stored and held in the optimized data storage section.

Before the galvanometric scanner system is actually used, a higher-level device issues a command for selecting a necessary drive mode to the scanner driver. The control unit in the scanner driver receives the external command, and thereupon reads the optimized data that correspond to the drive mode from the optimized data storage section, and sets the parameters of the electronic trimmer in accordance with the optimized data.

As also occurs in a case where the drive mode is changed to another drive mode, the higher-level device issues a command for selecting the drive mode that reflects the change to the scanner driver. The control unit in the scanner driver receives the external command, and thereupon reads the optimized data that correspond to the drive mode from the optimized data storage section, and updates the parameters set in the electronic trimmer in accordance with the optimized data.

Therefore, according to the invention, in a case where the drive mode of the galvanometric scanner is changed, the circuit constants of the scanner driver of the galvanometric scanner can be automatically optimized on the basis of a command from the higher-level device. Adjustment performed by manually manipulating variable resistors and other elements, which is required in related art, is not necessary; hence adjustment for optimizing the circuit constants of the scanner driver when the drive mode is changed can be performed readily, quickly, and accurately.

In the galvanometric scanner of the invention, circuit constant data optimized for a plurality of drive modes are stored in a storage section in the galvanometric scanner, which is prone to a large number of variation factors caused, for example, in the assembly process. Examples of the storage section are an internal memory in the galvanometric scanner and an external memory mounted on a circuit board associated with the scanner. Upon a request from the scanner driver, the optimized data stored and held in the storage section are outputted. In the scanner driver, adjustment parameters in the scanner driver are overwritten with the optimized data supplied from the galvanometric scanner.

Therefore, even when adjustment specifications are so strict that adjustment can only be performed by connecting the galvanometric scanner to the scanner driver to actually drive the galvanometric scanner, such strict adjustment specifications can be satisfied by a simple operation of selecting the optimized data that corresponds to the drive mode of interest.

For a variety of combinations of galvanometric scanners and scanner drivers, provided that optimized data of the scanner drivers for each drive mode of the galvanometric scanners are provided and the optimized data is stored and held, then even in a case where a combination of a scanner and a scanner driver is changed to another, the drive characteristics of the scanner driver can be adjusted by a simple operation without being affected by variation in the operating characteristics of the galvanometric scanner. It is therefore possible to significantly improve the productivity and maintenance properties of a galvanometric scanner.

BEST MODE FOR CARRYING OUT THE INVENTION

An embodiment of a galvanometric scanner system to which the invention is applied will be described below with reference to the drawings.

Figure 1:
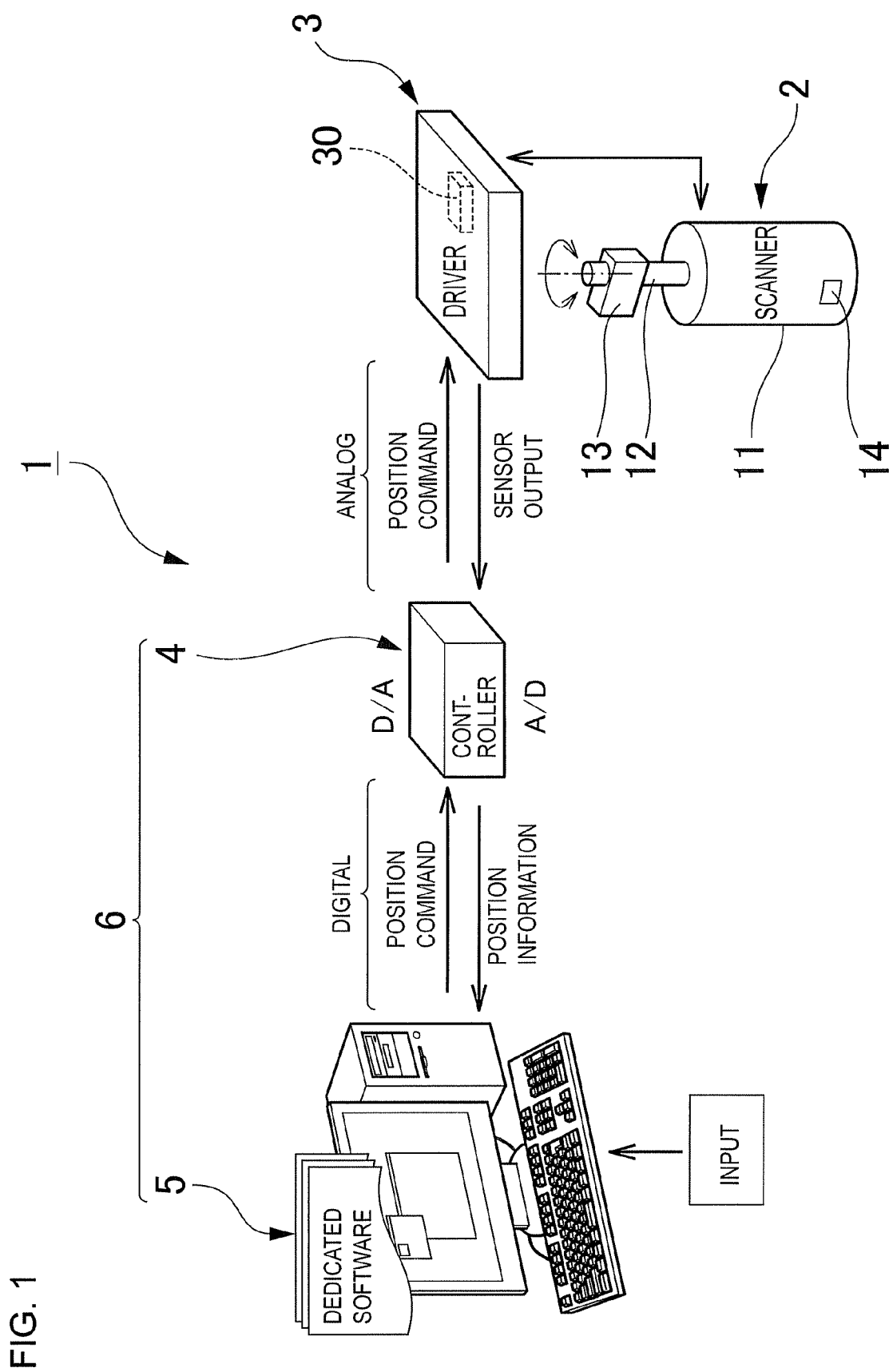
[FIG. 1] is a schematic configuration diagram of a galvanometric scanner system to which the invention is applied.

FIG. 1 is a schematic block diagram of the galvanometric scanner system of the embodiment. The galvanometric scanner system 1 includes a galvanometric scanner 2, a scanner driver 3 for driving the galvanometric scanner 2, and a command generator 6 including a controller 4 for controlling the scanner driver 3 and a personal computer 5.

A dedicated command generation program has been installed in the personal computer 5 in the command generator 6, and the personal computer 5 supplies a digital position command for the galvanometric scanner 2 to the controller 4. The controller 4 performs a D/A conversion on the digital position command to yield a command voltage that is an analog position command, and supplies the command voltage to a drive circuit 30 in the scanner driver 3. The drive circuit 30 in the scanner driver 3 generates a scanner drive voltage on the basis of the command voltage and applies the scanner drive voltage to the galvanometric scanner 2 so as to drive the galvanometric scanner 2 to the specified position.

The galvanometric scanner 2 includes a limited rotation motor 11 and a scan mirror 13 attached to a rotating shaft 12 of the motor. The galvanometric scanner 2 also includes a position sensor 14 for detecting the rotational angular position of the motor rotating shaft 12. An analog position detection output from the position sensor 14 is supplied to the controller 4 via the scanner driver 3. The controller 4 performs an A/D conversion on the analog position detection output to yield digital position information. The digital position information is supplied to the personal computer 5. The galvanometric scanner 2 is then feedback-controlled on the basis of the detected position of the galvanometric scanner 2 using a preset drive mode (such as the drive pattern and the drive speed).

For example, to drive the galvanometric scanner 2 from a position A to a target position B, it is necessary to change the applied command voltage from the command voltage that corresponds to the position A to the command voltage that corresponds to the target position B. The change in the command voltage outputted from the command generator 6 only corresponds to the final target position. Therefore, the operating characteristics, such as the path and time from the position A to the position B, need to be set by adjusting circuit constants of the analog drive circuit 30 in the scanner driver 3. Similarly, it is necessary to adjust the circuit constants of the drive circuit 30 in the scanner driver 3 in accordance with a variety of drive modes (such as the load, the drive pattern, and the response characteristics) so that the operating characteristics accord with the drive modes.

To optimize the circuit constants of the scanner driver 3 in accordance with the drive modes, the scanner driver 3 in the embodiment has a capability of setting and changing the circuit constants.

Figure 2:
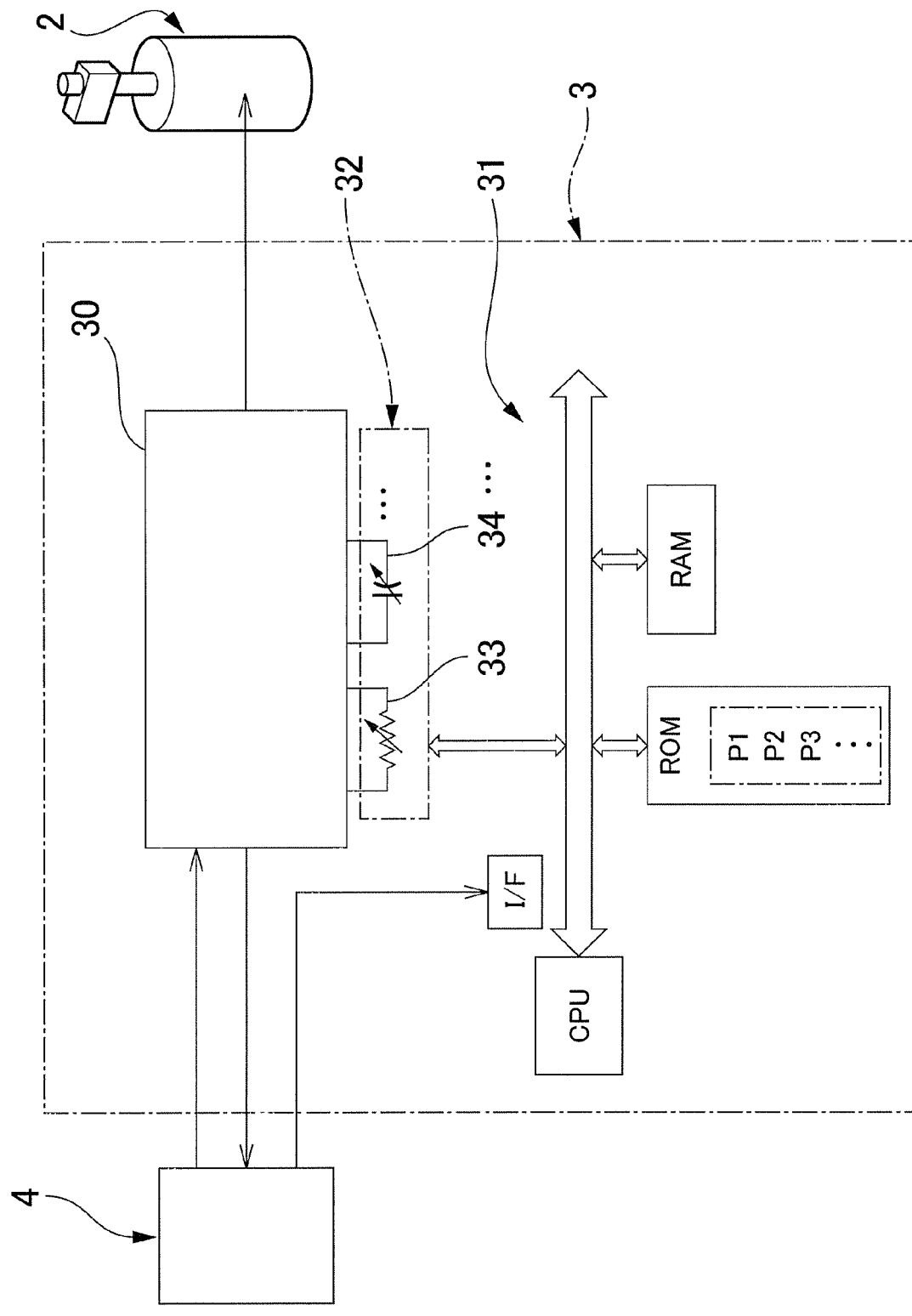
[FIG. 2] is a schematic configuration diagram showing the scanner driver in FIG. 1.

Referring to FIG. 2, the scanner driver 3 includes the analog drive circuit 30, a control unit 31 composed of a microcomputer, and an electronic trimmer 32. The control unit 31 includes a CPU, a ROM, and a RAM. The ROM reserves an optimized data storage area that stores and holds optimized data P1, P2, P3, . . . , each of which being a combination of optimal values of the driver circuit constants, in correspondence with a plurality of periodic command input waveforms (drive modes). The digital data may alternatively be stored and held in a rewritable state, for example, in a flash memory.

The control unit 31 receives a command for specifying a command input waveform from the higher-level command generator 6, reads the optimized data that corresponds to the command input waveform specified by the command from the ROM, and outputs a control signal to the electronic trimmer 32 according to the contents of the optimized data. The electronic trimmer 32 includes a plurality of resistor trimmers 33 and a plurality of capacitor trimmers 34, and sets the circuit constants of the drive circuit 30 in the scanner driver 3 on the basis of the optimized data.

In the galvanometric scanner system 1 of the above configuration, the galvanometric scanner 2 is first actually driven in accordance with a variety of drive modes requested by a user. The circuit constants of the drive circuit 30 in the scanner driver 3 that are optimal for the drive modes are determined on the basis of the actual drive state. The determined parameters are written to the ROM as optimized data for the drive modes.

Before actual use, the command generator 6 issues a command for selecting a necessary drive mode to the scanner driver 3. The control unit 31 in the scanner driver 3 receives the external command; reads the optimized data that corresponds to the drive mode from the ROM; and uses the resistor trimmers 33, the capacitor trimmers 34, and other elements in the electronic trimmer 32 to set the resistance, the capacitance, and other parameters for adjusting the circuit constants of the drive circuit 30 in the scanner driver 3 in accordance with the optimized data. The circuit constants of the scanner driver 3 are thus optimized in accordance with the selected drive mode.

As also occurs in a case where the drive mode is changed to another drive mode, the command generator 6 issues a command for selecting the drive mode that reflects the change to the scanner driver 3. The control unit 31 in the scanner driver 3 receives the external command, and thereupon reads the optimized data that corresponds to the drive mode from the ROM, and updates the parameters set in the electronic trimmer 32 in accordance with the optimized data. The drive circuit 30 in the scanner driver 3 thereby presents operating characteristics optimized in accordance with the drive mode that reflects the change.

As described above, in a case where the drive mode of the galvanometric scanner 2 is changed, the circuit constants of the driver of the galvanometric scanner 2 can be automatically optimized on the basis of a command from a higher-level device. Therefore, adjustment performed by manually manipulating variable resistors and other elements, which is required in related art, is not necessary; hence, adjustment for optimizing the driver circuit constants when the drive mode is changed can be performed readily, quickly, and accurately.

Figure 3:
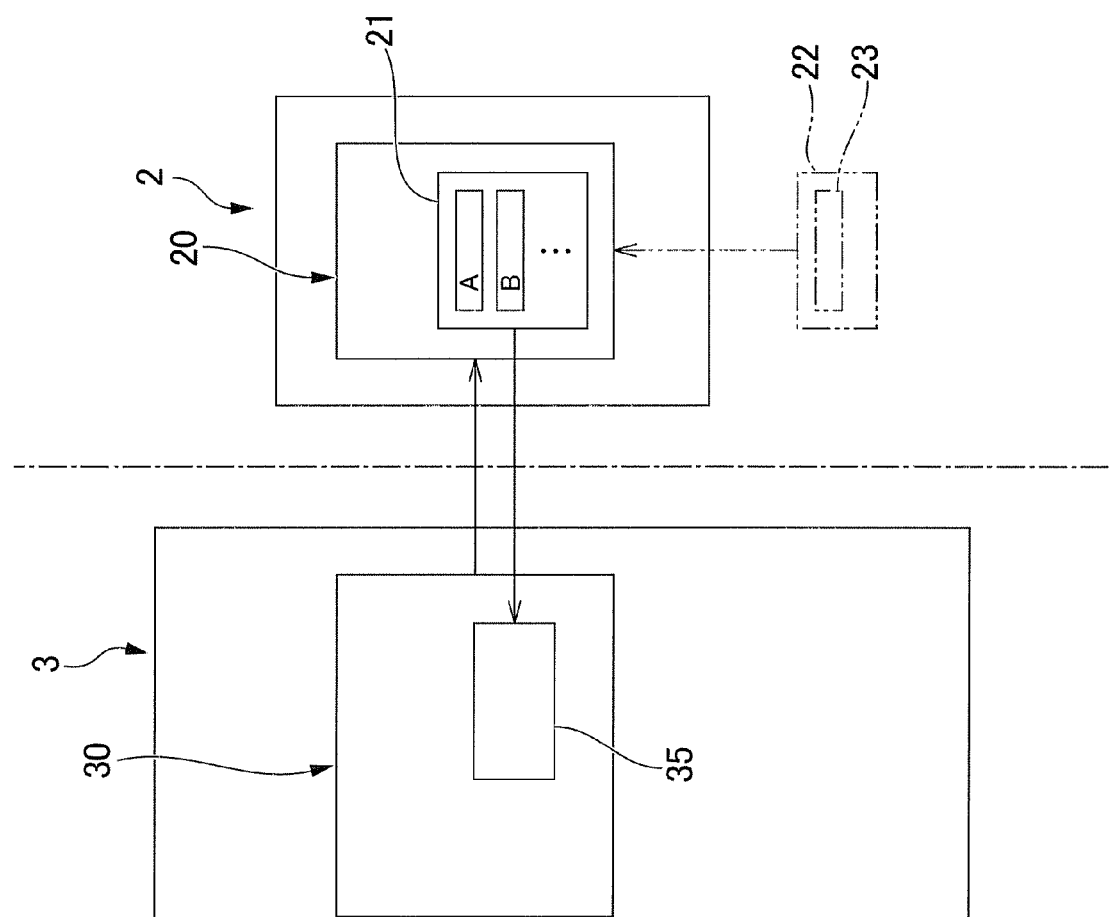
[FIG. 3] is a descriptive diagram that shows an example of a case in which the galvanometric scanner stores and holds optimized data.

In the above example, the scanner driver 3 stores and holds optimized data. Alternatively, the galvanometric scanner 2 may store and hold optimized data. Specifically, as shown in FIG. 3, an internal memory 21 (optimized data storage section) in a control unit 20 in the galvanometric scanner 2 stores and holds optimized data (adjustment parameters A, B, . . . ). The control unit 20 is configured to output specified optimized data and supply them to the scanner driver 3 in response to a request from the drive circuit 30 in the scanner driver 3. Instead of the internal memory 21, an external memory 23 mounted on a circuit board 22 associated with the galvanometric scanner may store and hold optimized data as indicated by the phantom line in FIG. 3.

In the scanner driver 3, an internal memory in the drive circuit 30 reserves a storage area 35. The scanner driver 3 requests the galvanometric scanner 2 to send the optimized data that corresponds to the drive mode specified by an external command, and sets optimized data supplied in response to the request in the storage area 35. Alternatively, the optimized data (adjustment parameters) set in the storage area 35 are overwritten with the supplied optimized data.

The invention claimed is:

1. A method for adjusting drive characteristics of a scanner driver of a galvanometric scanner, comprising:
   determining optimized data formed from combinations of optimal values of circuit constants of the scanner driver that drives the galvanometric scanner in accordance with a plurality of drive modes of the galvanometric scanner;
   storing and holding the optimized data, which correspond to the respective drive modes, in a scanner-side storage section in the galvanometric scanner or a driver-side storage section in the scanner driver;
   providing an external signal that specifies one of the drive modes to the scanner driver, whereby the optimized data that corresponds to the specified drive mode are outputted from the scanner-side storage section or the driver-side storage section; and,
   in the scanner driver, setting the circuit constants of the scanner driver or changing the previously set circuit constants of the scanner driver in accordance with the outputted optimized data.

2. The method for adjusting drive characteristics of a scanner driver of a galvanometric scanner of claim 1, wherein the plurality of drive modes of the galvanometric scanner are drive modes based on at least different loads, drive patterns, and response characteristics.

* * * * *